United States Patent
MacDonald et al.

(10) Patent No.: US 7,414,943 B2
(45) Date of Patent: Aug. 19, 2008

(54) METHOD AND APPARATUS FOR EXTRACTING INFORMATION FROM BURST CUTTING AREA OF RECORDING MEDIUM

(75) Inventors: Eric MacDonald, Los Gatos, CA (US); Advait Mogre, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 414 days.

(21) Appl. No.: 11/031,208

(22) Filed: Jan. 6, 2005

(65) Prior Publication Data

US 2006/0146680 A1 Jul. 6, 2006

(51) Int. Cl.
*G11B 20/10* (2006.01)
(52) U.S. Cl. .................. 369/59.25; 369/124.07
(58) Field of Classification Search ............ None
See application file for complete search history.

(56) References Cited

U.S. PATENT DOCUMENTS

| 7,061,850 B1 * | 6/2006 | Irie et al. ............ 369/59.24 |
| 2005/0163030 A1 * | 7/2005 | Irie et al. ............ 369/275.3 |

OTHER PUBLICATIONS

Standard ECMA-267, 120 mm DVD- Read-Only Disk, Apr. 2001, pp. 1-87.

* cited by examiner

*Primary Examiner*—Paul W. Huber
(74) *Attorney, Agent, or Firm*—Christopher P. Maiorana, PC (57) ABSTRACT

A method and apparatus extract information from a burst cutting area (BCA) of a recording medium. The BCA extraction includes (a) receiving a signal from the recording medium, the signal including BCA data read from the BCA, the BCA data being represented by channel symbols, (b) analog-to-digital (A/D) sampling the signal to generate input data, (c) identifying a BCA region within the input data, the BCA region corresponding to the BCA data, (d) determining an average channel symbol width of the BCA data, the average channel symbol width corresponding to an average number of A/D samples per channel symbol in the BCA data, (e) increasing a signal-to-noise ratio (SNR) of the BCA data using the average channel symbol width, (f) generating a channel pattern data from the BCA data using a selected threshold value, and (g) generating a channel symbol data from the channel pattern data using the average channel symbol width.

36 Claims, 8 Drawing Sheets

FIG. 8

METHOD AND APPARATUS FOR EXTRACTING INFORMATION FROM BURST CUTTING AREA OF RECORDING MEDIUM

FIELD OF THE INVENTION

The present invention relates to a method and apparatus for data extraction from a recording medium. More particularly, the present invention relates to a method and apparatus for extracting information from bust cutting area (BCA) of a recording medium.

BACKGROUND OF THE INVENTION

The BCA information is used in digital versatile disk (DVD) Read Only Disk, for example, type A and C disks, as specified in standardized specifications such as the ECMA-267 specification, high definition (HD) Read Only DVD specification, Blu-Ray Disc specification, and the like. The BCA may be used for other formats. One of the primary purposes of providing the BCA to each format is copy protection. The information contained within the BCA region is used by the disk player to establish the software to be used in conjunction with the contents of that disk. The BCA information (or code) can be the same for a series of disks or unique for each disk. For example, the BCA information may specify a serial number of the disk so as to identify individual disks. The BCA information is typically recorded after the end of the disk manufacturing process.

Figure 1:
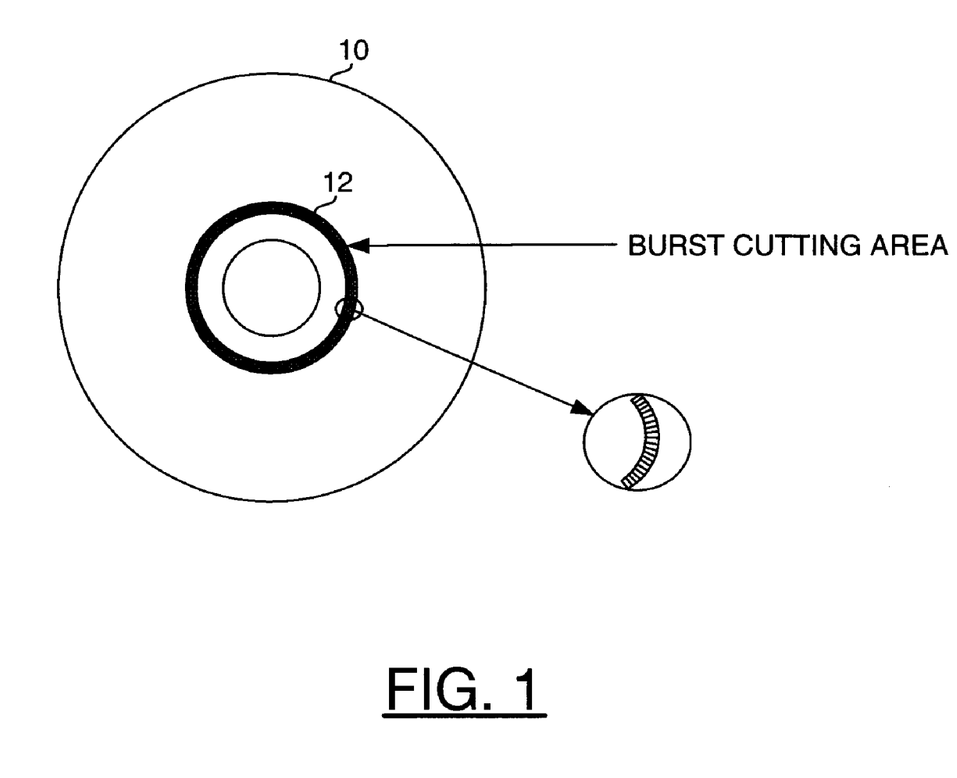
FIG. 1 is a diagram schematically illustrating a burst cutting area (BCA) provided on an optical disk.

FIG. 1 schematically illustrates a BCA 10 provided on an optical disk 12. The BCA 10 is an annular area inside of the lead-in area, typically at a radius about 22.3 mm to 23.5 mm. The BCA information is recorded using YAG laser after the main data content has been mastered on to the disk by the manufacturer. The information is "cut" into the reflective layer of the finished disk. The BCA information may also be recorded by means of replication process (stamping), for example, using embossed pits. The BCA information is written with a series of low reflectance stripes (or pits) arranged in circumferential direction and extending radially within the BCA region.

Conventionally, disk players read the BCA by rotating at a constant angular velocity (for example, 1440 rpm), moving the optical pickup unit (OPU) to the BCA area, focusing on the information surface, and using a special decoding circuit for the BCA signal which has a frequency much lower than a normal DVD high frequency (HF) signal. Typically, conventional solutions use dedicated hardware including some form of defect detection to extract the BCA channel data. Typically, the marks in the BCA are detected as a drop-out in the HF signal. Since the frequency of BCA signal is different from that of the normal DVD HF signal, additional hardware, such as phase lock loop (PLL) circuitry, is used to perfrom timing and data recovery on the extracted BCA data. Then, data formatting and error correction process (for example, using the Reed Solomon code) are performed on the BCA data to obtain the data contents.

BRIEF DESCRIPTION OF THE INVENTION

A method and apparatus extract information from a burst cutting area (BCA) of a recording medium. The BCA extraction includes (a) receiving a signal from the recording medium, the signal including BCA data read from the BCA, the BCA data being represented by channel symbols, (b) analog-to-digital (A/D) sampling the signal to generate input data, (c) identifying a BCA region within the input data, the BCA region corresponding to the BCA data, (d) determining an average channel symbol width of the BCA data, the average channel symbol width corresponding to an average number of A/D samples per channel symbol in the BCA data, (e) increasing a signal-to-noise ratio (SNR) of the BCA data using the average channel symbol width, (f) generating a channel pattern data form the BCA data using a selected threshold value, and (g) generating a channel symbol data from the channel pattern data using the average channel symbol width.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and apparatus for extracting information from bust cutting area of a recording medium. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, and the like. In addition, the method may be implemented in a disk driver such as a DVD driver.

Figure 2:
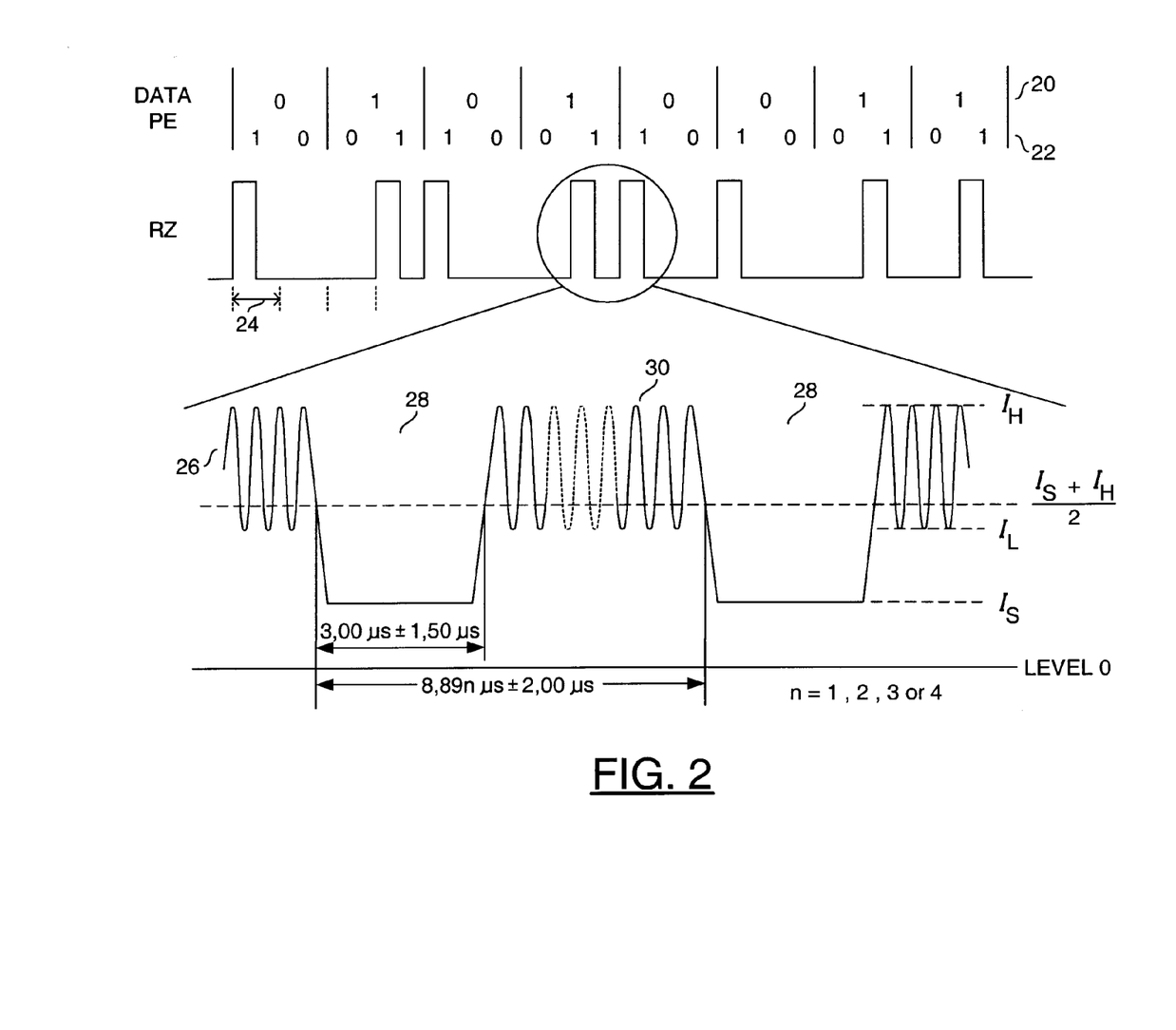
FIG. 2 is a diagram schematically illustrating an example of the BCA information in accordance with one embodiment of the present invention.

FIG. 2 schematically illustrates an example of the BCA information in accordance with one embodiment of the present invention. The information in the BCA is encoded by phase encoding according which a data symbol (ZERO or ONE) 20 is represented by two channel symbols (channel bits) 22. For example, a data symbol ZERO (0) is represented by two channel bits set to ONE-ZERO (10), and a data symbol ONE (1) is represented by two channel bits set to ZERO-ONE (01). The sequence of channel bits are modulated to the Return-to-Zero (RZ) modulation method as shown in FIG. 2. In recording the BCA information on the disk, the low reflectance stripes (or pits) are formed corresponding to pulses after the RZ modulation. The pulses (and the corresponding stripes) do not exceed half the width of a channel symbol (channel bit) 24.

FIG. 2 also schematically illustrates a read-out signal 26 from the BCA, which includes inverted pulses 28 corresponding to the RZ modulation signal, and an underlying DVD high frequency (HF) signal 30. That is, low reflective stripes (BCA marks) corresponding to the RZ signal pulses are detected as drop-outs (negative pulses) 28 in the HF signal 30. In accordance with the Standard ECMA-267, for example, the amplitude level ($I_S$) of the drop-out 28 does not exceed the low amplitude level ($I_L$) or one fifth (⅕) of the high amplitude level ($I_H$) of the HF signal 30. In this standard, the channel bit length of a BCA channel bit is about 8.89 μsec at a rotational speed of 1,440 rpm (24 Hz), and the length of the drop-outs 28 is 3.00 μsec±1.50 μsec. The deviation of the time interval between successive leading edges of the drop-outs 28 does not exceed 2.00 μsec. However, the present invention is not limited to one particular standard or specification.

Figure 3:
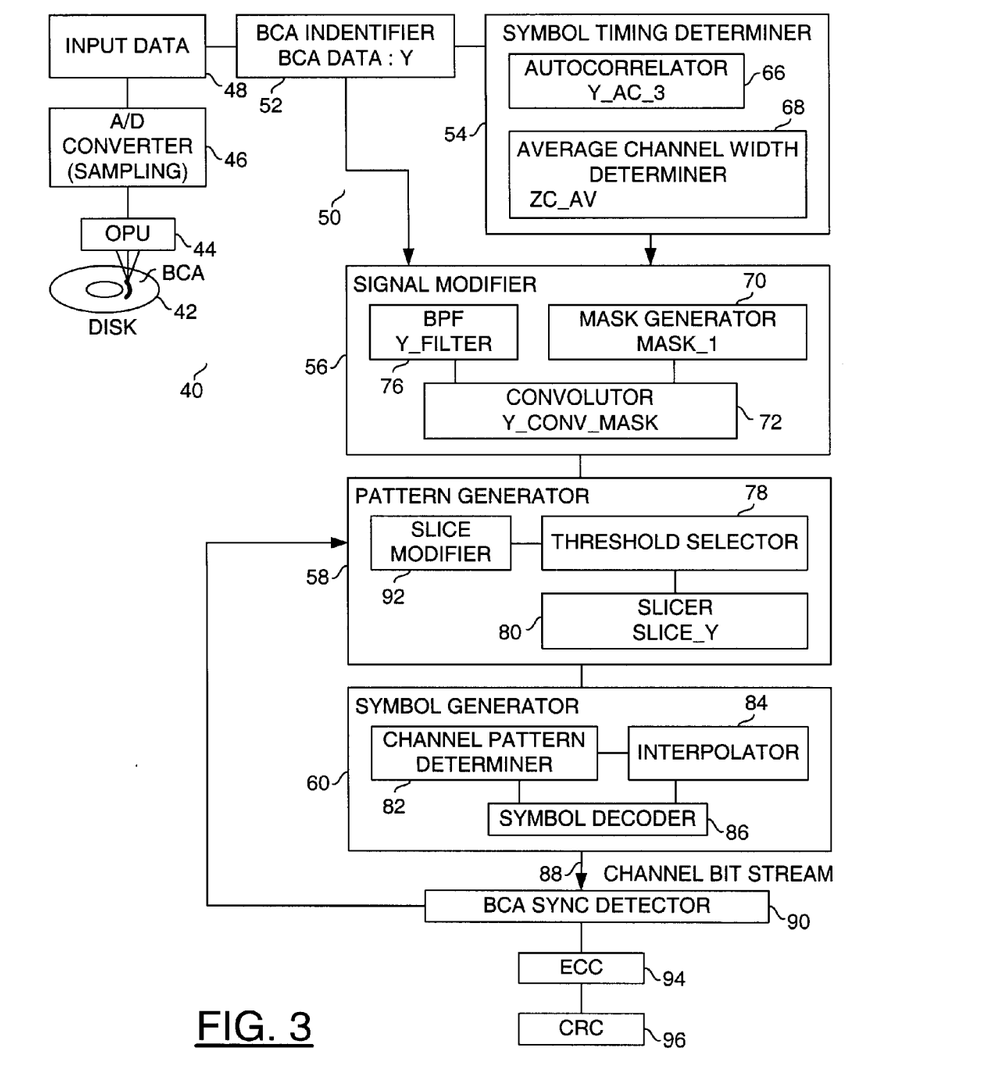
FIG. 3 is a block diagram schematically illustrating a system for extracting information from a BCA of a recording medium, in accordance with one embodiment of the present invention.

FIG. 3 schematically illustrates a system 40 for extracting information from a BCA of a recording medium 42 such as a DVD, in accordance with one embodiment of the present invention. The system includes an optical pickup unit (OPU) 44, an analog-to-digital (A/D) converter 46, a memory 48, and a BCA extraction module 50 coupled to the memory 48. The OPU 44 reads a signal from the recording medium 42, where the signal includes BCA data read from the BCA. The BCA data is represented by channel symbols (channel bits) as described above. The A/D converter 46 samples the read-out signal in accordance with a sampling clock so to generate input data. The memory 48 stores the input data (A/D samples) for the BCA data extraction process. The size of the memory 48 is selected such that a sufficiently large number of the A/D samples are captured therein. For example, the memory 48 holds the input data for at least two revolutions of the recording medium 42 such that at least one contiguous BCA data region exists within the captured A/S samples.

Figure 4:
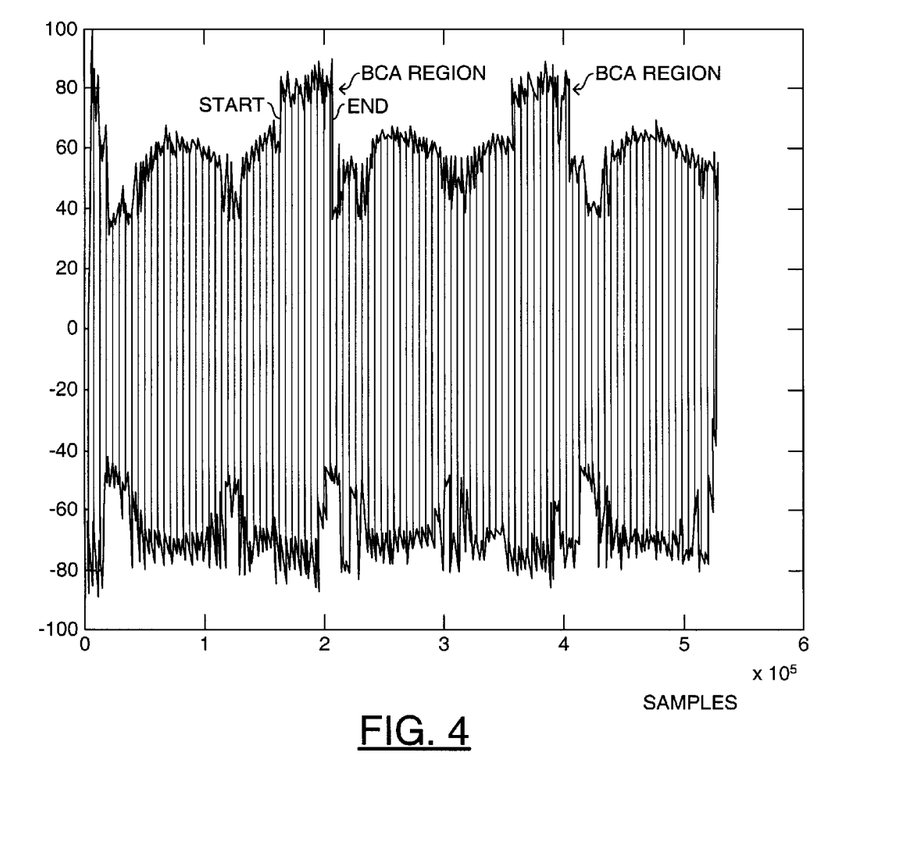
FIG. 4 is a diagram schematically illustrating an example of the input data captured in the memory, in accordance with one embodiment of the present invention.
Figure 5:
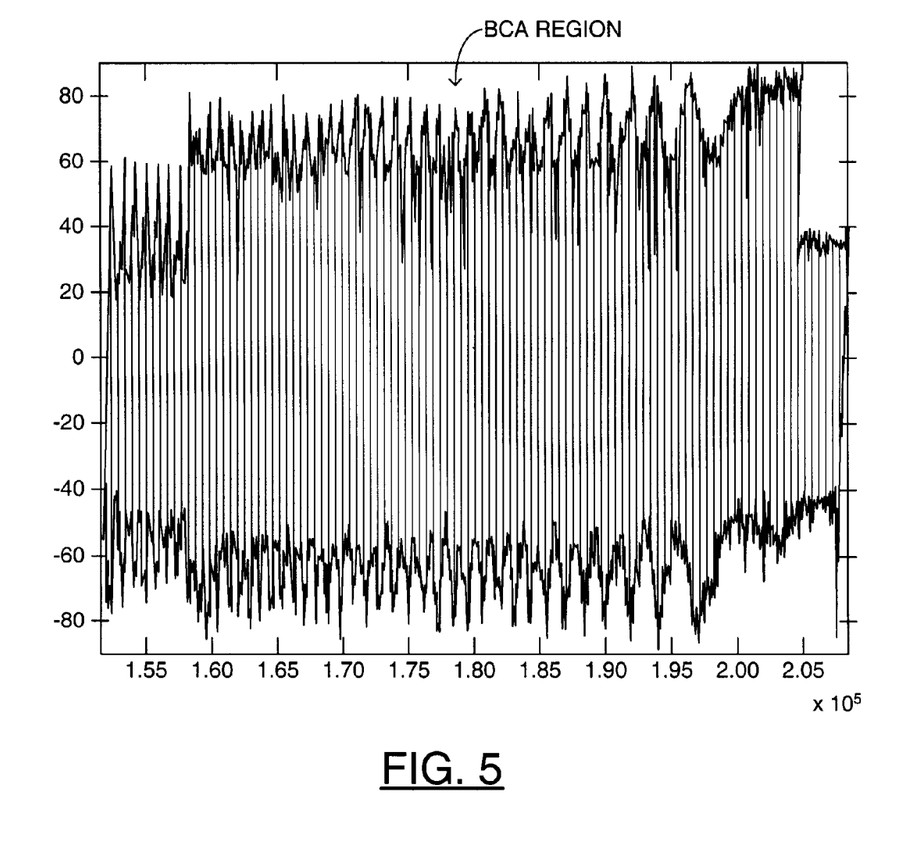
FIG. 5 is a diagram schematically illustrating an example of an established BCA region in the input data shown in FIG. 4.
Figure 6:
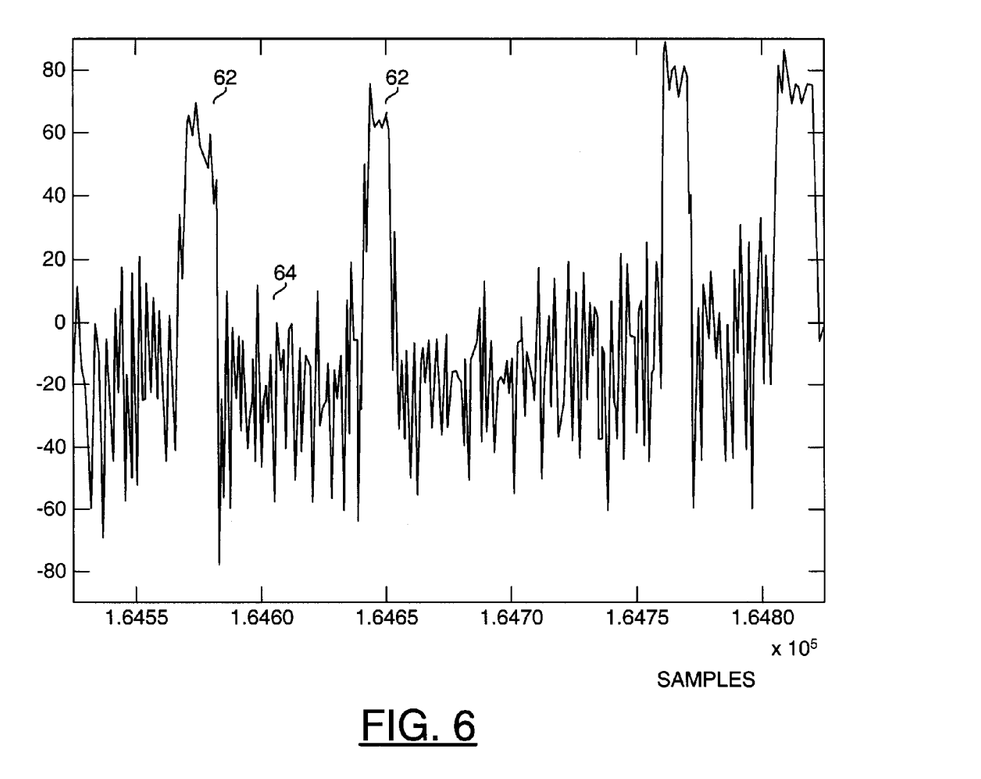
FIG. 6 is a diagram schematically illustrating pulses corresponding to BCA marks and underlying HF signal in a BCA region shown in FIG. 5.

The BCA extraction module 50 includes a BCA identifier 52, a symbol timing determiner 54, a signal modifier 56, a pattern generator 58, and a symbol generator 60. The BCA identifier 52 identifies a BCA region within the input data, which corresponds to the BCA data (y). FIG. 4 schematically illustrates an example of the input data captured in the memory 48. In this example, the entire BCA region is captured twice within the sampled data. It should be noted that the pulses are inverted and thus BCA pulses are illustrated as positive pulses in FIG. 4 (and also in FIGS. 5-6). Using the difference in the amplitude (peak) of the BCA signal and that of the underlying HF signal, the BCA within the captured samples is established. FIG. 5 schematically illustrates an example of an established BCA region. FIG. 6 schematically illustrates pulses 62 corresponding to BCA marks and underlying HF signal 64.

Figure 7:
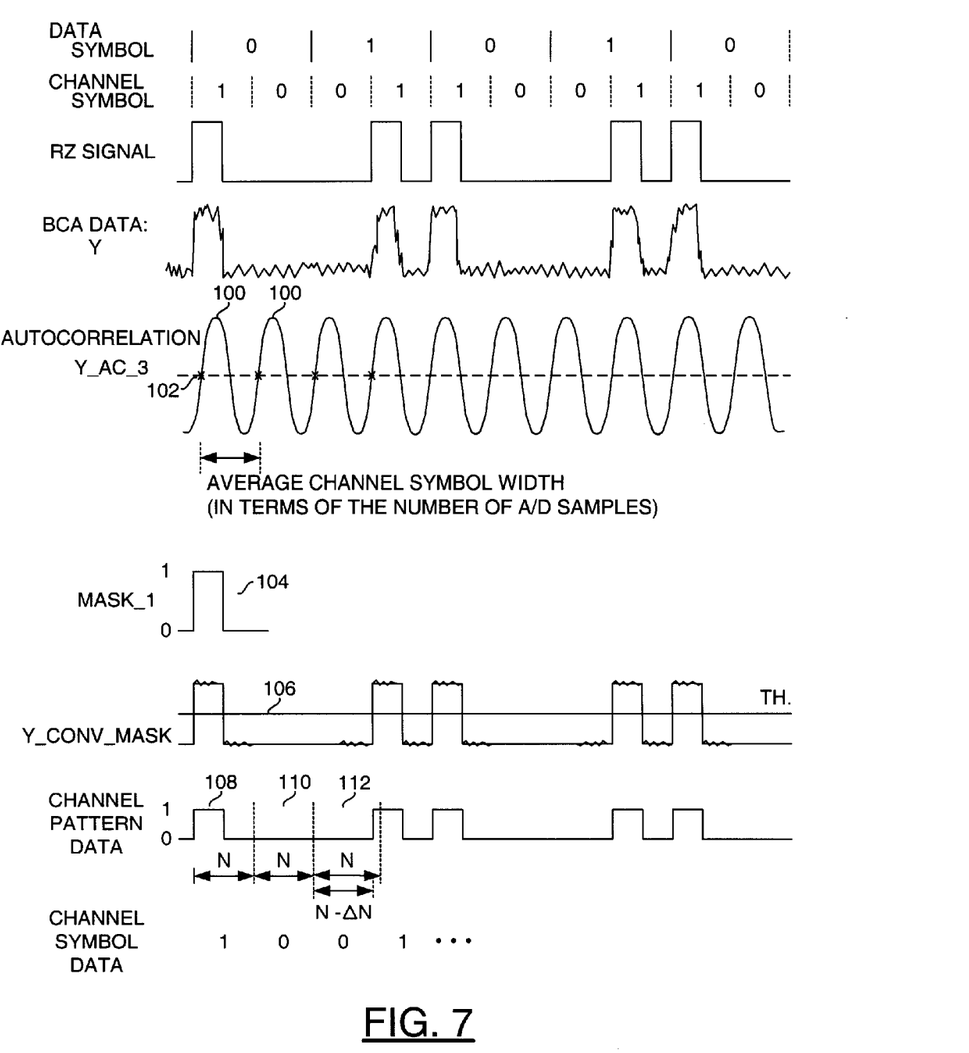
FIG. 7 is a diagram schematically illustrating an example of various signals in the BCA extraction process in accordance with one embodiment of the present invention.

The symbol timing determiner 54 is adapted to determine an average channel symbol width of the BCA data. Here, the average channel symbol width corresponds to an average number of A/D samples per channel symbol in the BCA data at a given A/D sampling clock. As shown in FIG. 3, the symbol timing determiner 54 includes an autocorrelator 66 and an average channel symbol width determiner 68. The autocorrelator 66 calculates an autocorrelation of the BCA data (y). For example, the autocorrelator 66 calculates the third order autocorrelation (y_ac_3), using a correlation window of a selected (programmable) size. FIG. 7 schematically illustrates an example of various signals in the BCA extraction process in accordance with one embodiment of the present invention. By auto-correlating the BCA data, a periodic function (y_ac_3) appears as shown in FIG. 7. The order of the autocorrelation is not limited to 3, but selected such that the resulting signal has a pulse in each channel.

The average channel symbol width determiner 68 determines the average number of A/D samples (zc_av) between zero-crossings 102 of the autocorrelation of the BCA data, as shown in FIG. 7. For example, an average interval between two negative-to-positive zero-crossings correspond to the average channel symbol widths. Alternatively, positive-to-negative zero-crossings may be used to determine the average channel symbol width.

The signal modifier 56 increases a signal-to-noise ratio (SNR) of the BCA data using the average channel symbol width. Referring back to FIG. 3, the signal modifier 56 includes a mask generator 70 and a convolutor 72. The mask generator 70 generates a channel pattern mask for channel bit ONE (mask_1) 104 (FIG. 7) having the average channel symbol width. The convolutor 72 calculates convolution of the BCA data (y) and the channel pattern mask (mask_1) so as to generate a modified BCA data having an increased SNR. In accordance with one embodiment of the present invention, the BCA data may be filtered using a low-pass filter or a band-pass filter before the convolution operation. For example, the signal modifier 56 may further include a band-pass-filter (BPF) 76, and the BCA data (y) may be band-pass filtered (y_filter), and then convolved with the channel pattern mask. The filtering and convolution remove or reduce the HF signal component, noise, DC component so as to improve the SNR of the BCA data. The BPF 76 (or other type of filters) may be provided outside the signal modifier 56 as a separate component.

The pattern generator 58 is coupled to the signal modifier 56, and adapted to generate a channel pattern data from the BCA data using a selected threshold value. As shown in FIG. 3, the pattern generator 58 includes a threshold selector 78 and a slicer 80. The threshold selector 78 selects a threshold value 106 (FIG. 7) based on the amplitude (absolute peak) of the modified BCA data. The threshold value is determined such that the pulses are well detected while eliminating or reducing the effect of noise. The slicer 72 assigns a first value (for example, "1") to the modified BCA data if the modified BCA data is greater than the threshold value 106, and assigns a second value (for example, "0") to the modified BCA data if the modified BCA data is not greater than the threshold value 106. The resulting signal (channel pattern data) has one of the two values at each A/D sampling point.

The symbol generator 60 is coupled to the pattern generator 58, and adapted to generate channel symbol data from the channel pattern data using the average channel symbol width. As shown in FIG. 3, the symbol generator 60 includes a channel pattern determiner 82, an interpolator 84, and a symbol decoder 86. The channel pattern determiner 82 determines one of first and second channel patterns for every average channel symbol width of the channel pattern data. For example, as shown in FIG. 7, the first channel pattern 108 (having a return-to-zero pulse) is determined for the average channel symbol width (first N samples), and the second channel pattern 110 (without pulse) is determined to the next average channel symbol width (the next N samples). The symbol decoder 86 assigns a first symbol (for example, "1") to the first channel pattern 108 and a second symbol (for example, "0") to the second channel pattern 110 in accordance with the encoding of the BCA.

Since the average channel symbol width is based on the average number of samples, it may not be the exact channel symbol width. Thus, there may be an offset, and as the symbols are assigned to the channel pattern data, the channel pattern may not fall within the estimated channel symbol width. For example, as shown in FIG. 7, the channel pattern 112 includes part of a pulse which should belong to the next channel pattern. Thus, interpolator 84 is adapted to modify the average channel symbol width (N samples) by a selected number ($\Delta N$) of A/D samples so as to find one of the first and second channel patterns within the modified channel symbol width. In the channel pattern 112, by modifying the channel symbol width (the number of samples) to N−$\Delta N$, the second pattern (i.e., without pulse) is found. If the estimated average channel symbol width is smaller than the actual channel symbol width, the modified channel symbol width would be N+$\Delta N$ samples. The interpolator 84, cooperative with the channel pattern determiner 82, performs "push-pull" operation to find the predetermined channel patterns. Accordingly, the output (channel symbol data) 88 of the symbol generator 60 is a channel bit (binary symbol) stream.

In accordance with one embodiment of the present invention, the system 40 may further include a state machine based sync detector 90 adapted to detect a BCA sync mark from the channel symbol data. The sync detector 90 extracts the BCA sync mark to parse the BCA channel symbol data. Since finding the BCA sync mark is necessary to further process the channel symbol data, if the BCA sync mark is not found, the channel pattern and symbol generation is iteratively repeated using a re-selected slicer threshold for a predetermined times. Thus, in accordance with one embodiment of the present invention, the system 40 may further include a slice modifier 92 adapted to change the selected threshold value if the BCA sync mark is not found. For example, the pattern generator 78 may further include the slice modifier 92, as shown in FIG. 3.

As shown in FIG. 3, the system 40 may further include an ECC processor 94 adapted to perform error correction code (ECC) decoding on the BCA data (channel symbol data), and a CRC checker 96 adapted to perform a cyclic redundancy check (CRC) on the decoded BCA data.

Figure 8:
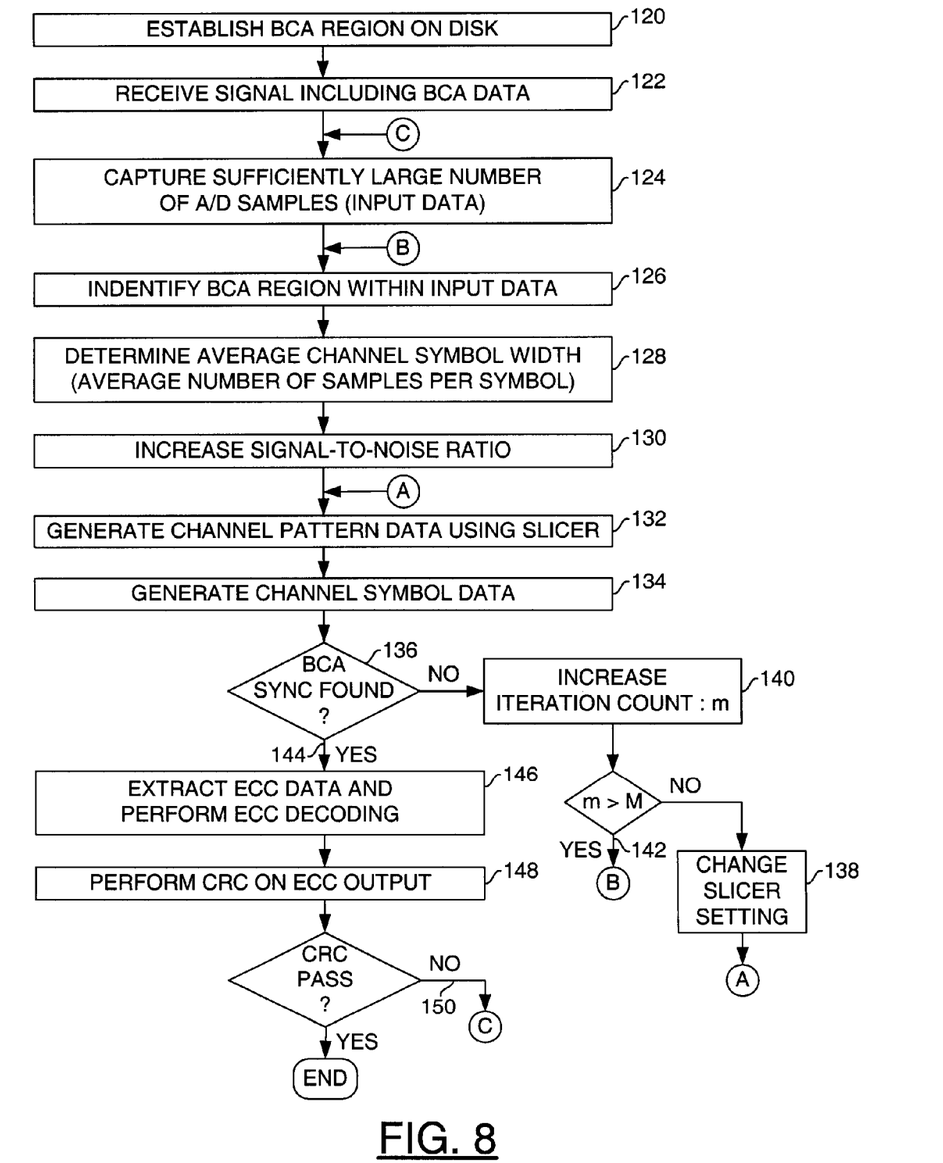
FIG. 8 is a process flow diagram schematically illustrating a method for extracting information from a BCA of a recording medium, in accordance with one embodiment of the present invention.

FIG. 8 schematically illustrates a method for extracting information from a burst cutting area (BCA) of a recording medium, in accordance with one embodiment of the present invention. The method may be performed using the BCA extraction module 40 described above.

First, the BCA region is established on the recording medium such as a DVD (120). For example, a disk player reads the BCA by rotating at a constant angular velocity, moving the optical pickup unit (OPU) to the BCA area. The read signal including BCA data is received (122), and a sufficiently large number of A/D samples are captured as input data (124). The number of A/D samples is selected such that at least one contiguous BCA region is present in the input data at a given sampling clock. The BCA region in the samples corresponds to the BCA data. Then, the BCA region is identified within the input data (126), for example, using the relative difference in the amplitude (absolute peak) between the BCA signal and the underlying HF signal of the disk.

Then, an average channel symbol width is determined (128), which corresponds to an average number of A/D samples per channel symbol, or average number of the A/D sampling clock cycles per channel symbol. The average channel symbol width determination may include calculating an autocorrelation of the BCA data (for example, the 2nd order autocorrelation or higher, typically the 3rd order), and determining the average number of A/D samples between zero-crossings of the autocorrelation of the BCA data.

The signal-to-noise ratio (SNR) of the BCA data is increased (130) using the average channel symbol width. For example, a channel pattern mask having the average channel symbol width is generated, and convolved with the BCA data so as to generate a modified BCA data having an increased SNR. In addition, the BCA data may be low-pass filtered or band-pass filtered before the convolution.

A channel pattern data is generated from the BCA data using a selected threshold value (slicer) (132). For example, the channel pattern data may be generated by selecting a threshold value based on an amplitude of the modified BCA data, and assigning a first value ("1", for example) to the modified BCA data if the BCA data is greater than the threshold value, and otherwise a second value ("0", for example) to the modified BCA data.

A channel symbol data is generated (134) from the channel pattern data using the average channel symbol width. For example, the channel symbol data may be generated by determining one of first and second channel patterns for every average channel symbol width of the channel pattern data, and assigning a first symbol to the first channel pattern and a second symbol to the second channel pattern. In addition, in determining one of the first and second channel patterns, the average channel symbol width may be modified by a selected number of A/D samples to find one of the first and second channel patterns within the modified channel symbol width (interpolation).

Then, a BCA sync mark is detected from the channel symbol data (136). If the BCA sync mark is not found, the slicer setting (selected threshold value) is changed (138), and the generating the channel pattern data (132) and the generating the cannel symbol data (134) are iteratively repeated for a predetermined time until the BCA sync mark is found. For example, an iteration count (m) may be increased (140) each time the BCA is not found after initializing the count to zero (0). If the BCA sync mark is not found (142) after a predetermined number (M) for maximum iteration for the process steps 138, 132, and 134, the process returns to the identification of the BCA region within the input data (126), and the subsequent process steps are re-performed.

If the BCA sync mark is found (144), error correction code (ECC) is extracted and ECC decoding is performed (146) on the channel symbol data. A cyclic redundancy check (CRC) is also performed (148) on the decoded channel symbol data (ECC output). If the CRC is not successful (150), the process returns to the capturing of the input data (124), and the subsequent process steps are re-performed.

As described above, in accordance with the embodiments of the present invention, the BCA extraction is performed using a set of software routines or modules. After locating the BCA region and capturing the BCA data, the channel symbol timing is extracted as an average channel symbol width by looking at the average zero-crossings of (the 3rd order) autocorrelation performed on the over-sampled channel data. A channel bit "1" pattern mask having the average channel symbol width is constructed. This channel pattern mask is convolved with a low-pass or band-pass filtered version of the BCA data such that the resulting output has a sufficient SNR for "slicing." In "slicing," the BCA data is compared with a threshold to obtain two-value data. That is, the "sliced" BCA data samples have one of the two values, i.e., "1" or "0" (over-sampled 1's and 0's) corresponding to the channel pattern (i.e., corresponding the RZ modulation signal pattern). An interpolation is performed on this over-sampled output to obtain the correct symbol timing for the channel bit (symbol) stream. The channel pattern data is demodulated using the correct (interpolated) symbol timing to recover the channel symbols. The resulting channel symbol data is a stream of binary 1's and 0's. A BCA sync mark detector is then used on this channel symbol stream to locate the BCA sync marks and parse out the relevant BCA data. This extracted data is then post-processed using standard ECC decoding algorithms (constructed to deal with the BCA ECC scheme as specified in the given format specification, for example, Reed-Solomon based ECC). Finally, a CRC check, as specified by the given format, is performed on the ECC output to ensure that the thus-obtained information is error free.

Since the BCA extraction in accordance with the present invention is a software-based implementation, it is easily modifiable; compared with conventional hardware-based implementation. In addition, it can incorporate a sufficient degree of programmability to enable the user to successfully extract BCA data. For example, the amount of samples to be captured, the order of autocorrelation, the degree of SNR improvement, selection of a slicing threshold, the number of iteration, the push-pull operation in the interpolation, and the like. One or more of these parameters can be modified to optimize the extraction process. The BCA extraction in accordance with present invention does not depend upon a synchronous feedback based timing recovery technique such as PLL, which is typically expensive and also requires extra die area. The software-based BCA extraction does not add to the existing hardware. Furthermore, since BCA extraction is a one-time operation performed at the start of the read process, this operation need not be done in "real time." It can be performed sufficiently quickly (and reliably) before the content decoding so as to provide the system (disk player) with the necessary details regarding the software to be used for the actual content decoding.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for extracting information from a burst cutting area (BCA) of a recording medium, said method comprising:
receiving a signal from the recording medium, the signal including BCA data read from the BCA, the BCA data being represented by channel symbols;
analog-to-digital (A/D) sampling the signal to generate input data;
identifying a BCA region within the input data, the BCA region corresponding to the BCA data;
determining an average channel symbol width of the BCA data, the average channel symbol width being an average number of A/D samples per channel symbol in the BCA data;
increasing a signal-to-noise ratio (SNR) of the BCA data using the average channel symbol width;
generating a channel pattern data from the BCA data using a selected threshold value; and
generating a channel symbol data from the channel pattern data using the average channel symbol width.

2. The method of claim 1, wherein said determining includes:
calculating an autocorrelation of the BCA data; and
determining the average number of A/D samples between zero-crossings of the autocorrelation of the BCA data.

3. The method of claim 2, wherein said calculating the autocorrelation includes:
calculating a third-order autocorrelation of the BCA data.

4. The method of claim 2, wherein said increasing the SNR includes:
generating a channel pattern mask having the average channel symbol width; and
convoluting the BCA data and the channel pattern mask so as to generate a modified BCA data having an increased SNR.

5. The method of claim 4, further comprising:
band-pass-filtering the BCA data before said convoluting.

6. The method of claim 2, wherein said generating the channel pattern data includes:
selecting a threshold value based on an amplitude of the modified BCA data;
assigning a first value to the modified BCA data if the BCA data is greater than the threshold value; and
assigning a second value to the modified BCA data if the BCA data is not greater than the threshold value.

7. The method of claim 6, wherein said generating the channel symbol data includes:
determining one of first and second channel patterns for every average channel symbol width of the channel pattern data; and
assigning a first symbol to the first channel pattern and a second symbol to the second channel pattern.

8. The method of claim 7, wherein said determining one of the first and second channel patterns includes:

modifying the average channel symbol width by a selected number of A/D samples to find one of the first and second channel patterns within the modified channel symbol width.

9. The method of claim 1, further comprising:
detecting a BCA sync mark from the channel symbol data.

10. The method of claim 9, further comprising:
changing the selected threshold value if the BCA sync mark is not found; and
repeating said generating the channel pattern data and said generating the cannel symbol data.

11. The method of claim 10, further comprising:
if the BCA sync mark is not found after a predetermined number of iteration of said changing the selected threshold and said repeating, repeating said identifying the BCA region, said determining the average channel symbol width, said increasing the SNR, said generating the channel pattern data, and said generating the channel symbol data.

12. The method of claim 9, further comprising:
performing error correction code decoding on the channel symbol data;
performing a cyclic redundancy check (CRC) on the decoded channel symbol data; and
if the CRC is not successful, repeating said analog-to-digital sampling the signal to generate the input data, said identifying the BCA region, said determining the average channel symbol width, said increasing the SNR, said generating the channel pattern data, and said generating the channel symbol data.

13. A system for extracting information from a burst cutting area (BCA) of a recording medium, said system comprising:
an optical pickup unit for reading a signal from the recording medium, the signal including BCA data read from the BCA, the BCA data being represented by channel symbols;
an analog-to-digital (A/D) converter adapted to sample the signal to generate input data;
a memory coupled to said A/D converter, adapted to capture the input data;
a BCA extraction module coupled to said memory, including:
a BCA identifier adapted to identify a BCA region within the input data, the BCA region corresponding to the BCA data;
a symbol timing determiner adapted to determine an average channel symbol width of the BCA data, the average channel symbol width being an average number of A/D samples per channel symbol in the BCA data;
a signal modifier adapted to increase a signal-to-noise ratio (SNR) of the BCA data using the average channel symbol width;
a pattern generator adapted to generate a channel pattern data from the BCA data using a selected threshold value; and
a symbol generator adapted to generate a channel symbol data from the channel pattern data using the average channel symbol width.

14. The system of claim 13, wherein said symbol timing determiner includes:
an autocorrelator adapted to calculate an autocorrelation of the BCA data; and
an average channel symbol width determiner adapted to determine the average number of A/D samples between zero-crossings of the autocorrelation of the BCA data.

15. The system of claim 14, wherein said autocorrelator calculates a third-order autocorrelation of the BCA data.

16. The system of claim 14, wherein said signal modifier includes:
a mask generator adapted to generate a channel pattern mask having the average channel symbol width; and
a convolutor adapted to calculate convolution of the BCA data and the channel pattern mask so as to generate a modified BCA data having an increased SNR.

17. The system of claim 16, further comprising:
a band-pass-filter for the BCA data, adapted to band-pass-filter the BCA data before the convolution operation.

18. The system of claim 14, wherein said pattern generator includes:
a threshold selector adapted to select a threshold value based on an amplitude of the modified BCA data;
a slicer adapted to assign a first value to the modified BCA data if the BCA data is greater than the threshold value, and assign a second value to the modified BCA data if the BCA data is not greater than the threshold value.

19. The system of claim 18, wherein said symbol generator includes:
a channel pattern determiner adapted to determine one of first and second channel patterns for every average channel symbol width of the channel pattern data; and
a symbol decoder adapted to assign a first symbol to the first channel pattern and a second symbol to the second channel pattern.

20. The system of claim 19, wherein said channel pattern determiner includes:
an interpolator adapted to modify the average channel symbol width by a selected number of A/D samples to find one of the first and second channel patterns within the modified channel symbol width.

21. The system of claim 13, further comprising:
a sync detector adapted to detect a BCA sync mark from the channel symbol data.

22. The system of claim 21, further comprising:
a slice modifier adapted to change the selected threshold value if the BCA sync mark is not found.

23. The system of claim 21, further comprising:
an ECC processor adapted to perform error correction code decoding on the channel symbol data; and
a CRC checker adapted to perform a cyclic redundancy check (CRC) on the decoded channel symbol data.

24. An apparatus for extracting information from a burst cutting area (BCA) of a recording medium, said apparatus comprising:
means for receiving a signal from the recording medium, the signal including BCA data read from the BCA, the BCA data being represented by channel symbols;
means for analog-to-digital (A/D) sampling the signal to generate input data;
means for identifying a BCA region within the input data, the BCA region corresponding to the BCA data;
means for determining an average channel symbol width of the BCA data, the average channel symbol width being an average number of A/D samples per channel symbol in the BCA data;
means for increasing a signal-to-noise ratio (SNR) of the BCA data using the average channel symbol width;
means for generating a channel pattern data from the BCA data using a selected threshold value; and
means for generating a channel symbol data from the channel pattern data using the average channel symbol width.

25. The apparatus of claim 24, wherein said means for determining includes:

means for calculating an autocorrelation of the BCA data; and means for determining the average number of A/D samples between zero-crossings of the autocorrelation of the BCA data.

26. The apparatus of claim 25, wherein said means for calculating the autocorrelation includes:

means for calculating a third-order autocorrelation of the BCA data.

27. The apparatus of claim 25, wherein said means for increasing the SNR includes:

means for generating a channel pattern mask having the average channel symbol width; and means for convoluting the BCA data and the channel pattern mask so as to generate a modified BCA data having an increased SNR.

28. The apparatus of claim 27, further comprising:

means for band-pass-filtering the BCA data before convoluting the BCA data and the channel pattern mask.

29. The apparatus of claim 25, wherein said means for generating the channel pattern data includes:

means for selecting a threshold value based on an amplitude of the modified BCA data;

means for assigning a first value to the modified BCA data if the BCA data is greater than the threshold value; and means for assigning a second value to the modified BCA data if the BCA data is not greater than the threshold value.

30. The apparatus of claim 29, wherein said means for generating the channel symbol data includes:

means for determining one of first and second channel patterns for every average channel symbol width of the channel pattern data; and means for assigning a first symbol to the first channel pattern and a second symbol to the second channel pattern.

31. The apparatus of claim 30, wherein said means for determining one of the first and second channel patterns includes:

means for modifying the average channel symbol width by a selected number of A/D samples to find one of the first and second channel patterns within the modified channel symbol width.

32. The apparatus of claim 24, further comprising:

means for detecting a BCA sync mark from the channel symbol data.

33. The apparatus of claim 32, further comprising:

means for changing the selected threshold value if the BCA sync mark is not found, and means for repeating operation of said means for generating the channel pattern data and said means for generating the cannel symbol data perform.

34. The apparatus of claim 33, further comprising:

means for repeating operation of said means for identifying the BCA region, said means for determining the average channel symbol width, said means for increasing the SNR, said means for generating the channel pattern data, and said means for generating the channel symbol data, if the BCA sync mark is not found after a predetermined number of iteration of said changing the selected threshold and said repeating.

35. The apparatus of claim 32, further comprising:

means for performing error correction code decoding on the BCA data;

means for performing a cyclic redundancy check (CRC) on the decoded BCA data; and means for repeating operation of said means for analog-to-digital sampling the signal to generate the input data, said means for identifying the BCA region, said means for determining the average channel symbol width, said means for increasing the SNR, said means for generating the channel pattern data, and said means for generating the channel symbol data, if the CRC is not successful.

36. A program storage device readable by a machine, tangibly embodying a program of instructions executable by the machine to perform a method for method for extracting information from a burst cutting area (BCA) of a recording medium, said method comprising:

receiving a signal from the recording medium, the signal including BCA data read from the BCA, the BCA data being represented by channel symbols;

analog-to-digital (A/D) sampling the signal to generate input data;

identifying a BCA region within the input data, the BCA region corresponding to the BCA data;

determining an average channel symbol width of the BCA data, the average channel symbol width being an average number of A/D samples per channel symbol in the BCA data;

increasing a signal-to-noise ratio (SNR) of the BCA data using the average channel symbol width;

generating a channel pattern data from the BCA data using a selected threshold value; and generating a channel symbol data from the channel pattern data using the average channel symbol width.

* * * * *